No. 712,458. Patented Oct. 28, 1902.
C. H. KNAPP.
BEAN CUTTER AND PULLER.
(Application filed Oct. 3, 1901.)
(No Model.)
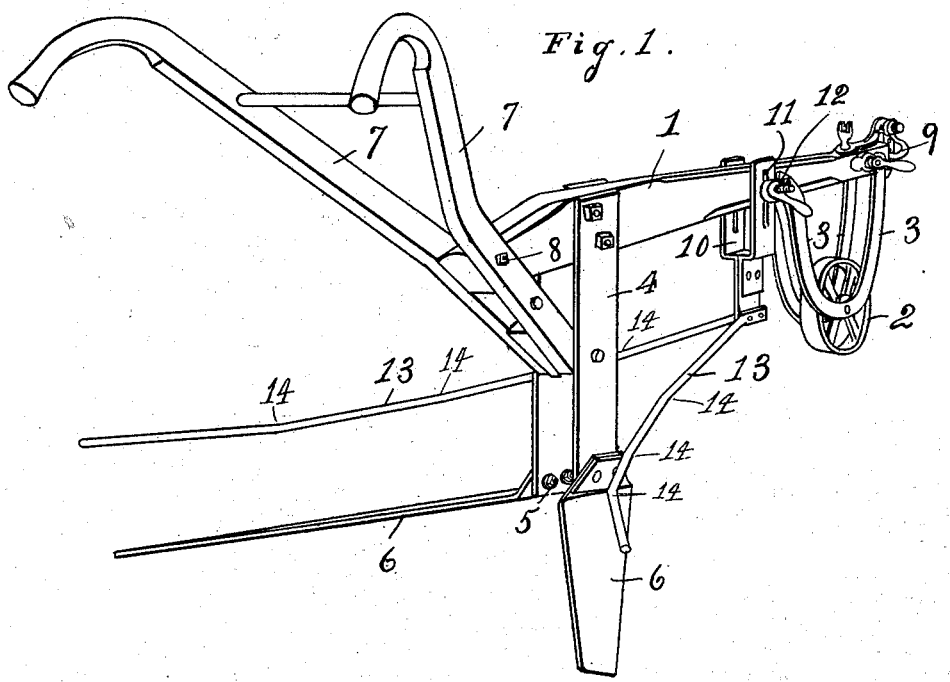
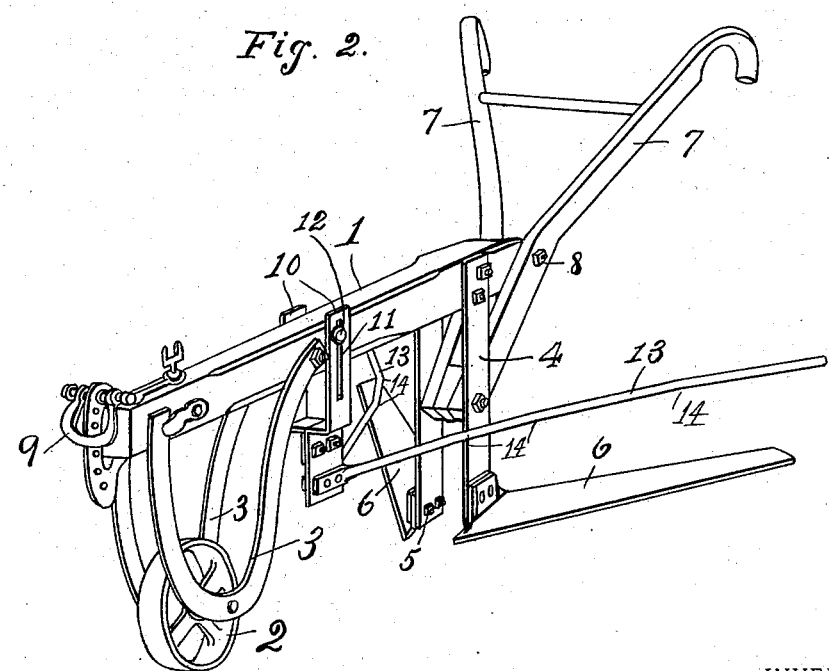
WITNESSES:
K. Lockwood Nevins.
Cecelia Powning.
INVENTOR.
Chas. H. Knapp
BY
Francis M. Wright.
ATTORNEY.

United States Patent Office.

CHARLES H. KNAPP, OF HALFMOON BAY, CALIFORNIA.

BEAN CUTTER AND PULLER.

SPECIFICATION forming part of Letters Patent No. 712,458, dated October 28, 1902.

Application filed October 3, 1901. Serial No. 77,354. (No model.)

*To all whom it may concern:*

Be it known that I, CHARLES H. KNAPP, a citizen of the United States, residing at Halfmoon Bay, in the county of San Mateo and State of California, have invented certain new and useful Improvements in Bean Cutters and Pullers, of which the following is a specification.

My invention relates to an improved bean cutter and puller, the object of my invention being to provide an apparatus of this character by which the beans can be pulled with ease, rapidity, and uniformity by the draft of a single horse without danger of spilling the beans out of the pods, so that the bean-stalks are laid in rows upon the ground in such a manner as to permit the beans to ripen, and without the necessity of furrowing the land, the ground being left perfectly flat.

My invention therefore resides in the novel construction, combination, and arrangement of parts for the above ends hereinafter fully specified, and particularly pointed out in the claims.

In the accompanying drawings, Figure 1 is a perspective view of my improved apparatus looking from the rear end of the same, and Fig. 2 is a similar view thereof looking from the front end.

Referring to the drawings, 1 represents a beam supported at its front end upon a wheel 2 by means of curved bars 3, the axle of the wheel being journaled in the middle of said bars and the ends of the bars being secured to said beam. At its rear end said beam is supported upon an open-bottomed standard 4, the latter secured at its top to the sides of the beam, and its ends secured, as shown at 5, to the upwardly-bent ends of the knives or plates 6, said plates resting on the ground and diverging rearwardly from their point of attachment to the standard. Between the members of the standard 4 are secured the front ends of the handles 7, the latter also being secured, as shown at 8, to the rear end of the beam. At the front end of the beam is provided a clevis 9 for attaching the apparatus to the draft-harness to draw the same along the ground. At about the middle point of the beam is attached a forked hanger 10, said hanger being adjustable in height by means of the slots 11 and the bolt 12, and to the lower end of said hanger are secured iron bars 13, diverging rearwardly. Said bars 13 thus extend from substantially a common point rearwardly first at a somewhat acute angle and are bent outward at intervals at the points 14, so that at their ends said bars are extending substantially parallel with the knives or plates 6. It is found that this construction is of great value in pushing the beans to one side and raising the stalks to a position to be engaged by the knives.

The operation of the apparatus is as follows: The apparatus is drawn by a single horse walking between two rows of beans. The knives loosen the ground at the roots of the beans, and the curved bars engage the stalks and gradually turn them over and lay them in regular rows on each side. When the return is made across the field, the horse walks in the next space but one between the rows, so that the next row of beans is now laid down on top of the pile or row just deposited next to it in the previous passage across the field.

By this construction the apparatus may be made lighter than heretofore with constructions for this purpose. There is no heavy standard extending down into the ground and making a furrow in the ground. Moreover, the beans are laid in rows without any covering of earth, so that they can ripen in the sun, and they are laid down without violence, so that there is no danger of the beans being shaken out of the pods.

I claim—

1. In an apparatus of the character described, the combination of a beam, a wheel for the front end thereof, rearwardly-diverging knives resting on the ground and supporting the rear end thereof, and rearwardly-diverging bars extending substantially from a common point in front of the knives, and at a sufficient height above said knives to engage the bean-stalks and lay the same in rows, said bars extending first at an acute angle and then diverging at a greater angle so as to extend at their ends substantially parallel with said knives, substantially as described.

2. In an apparatus of the character described, the combination of a beam, a wheel supporting the front end thereof, a standard supporting the rear end thereof, a handle attached to said standard and said rear end, knives supporting said standard and resting on the ground, said knives diverging rearwardly from their point of attachment to said standard, a fork adjustably attached to the beam in front of said standard, and bars attached to the lower end of said fork and diverging rearwardly therefrom, said bars 13 extending from substantially a common point rearwardly first at a somewhat acute angle and bent outward at intervals at points 14, so that at their ends said bars are extending substantially parallel with the knives 6, substantially as described.

In witness whereof I have hereunto set my hand in the presence of two subscribing witnesses.

C. H. KNAPP.

Witnesses:
 FRANCIS M. WRIGHT,
 CECELIA POWNING.